United States Patent [19]

Rehlander

[11] Patent Number: 4,580,462
[45] Date of Patent: Apr. 8, 1986

[54] VEHICLE STEERING MECHANISM
[76] Inventor: Weber Rehlander, 4922 N. Fail Rd., LaPorte, Ind. 46350
[21] Appl. No.: 653,545
[22] Filed: Sep. 24, 1984
[51] Int. Cl.<sup>4</sup> .................. B62D 7/00; B62D 1/20; B62D 3/12
[52] U.S. Cl. ..................... 74/497; 74/99 R; 74/109; 280/94; 280/96
[58] Field of Search .............. 74/497, 99 R, 109; 280/94, 96

[56] References Cited
U.S. PATENT DOCUMENTS

| | | | |
|---|---|---|---|
| 858,186 | 6/1907 | Huber | 74/497 X |
| 1,320,278 | 10/1919 | Scheble | 74/497 |
| 1,328,681 | 1/1920 | Macdonald | 280/94 |
| 1,666,386 | 4/1928 | Johnson | 280/94 |
| 1,701,434 | 2/1929 | Wright | 280/94 |
| 3,256,749 | 6/1966 | Grohsbach | 280/96 X |

Primary Examiner—Allan D. Herrmann
Attorney, Agent, or Firm—Thomas J. Dodd

[57] ABSTRACT

A steering mechanism for a vehicle which includes a disk and a pair of rollers which rotate 180° about a series of fingers to turn the wheels. The pivot member of the steering mechanism includes a slot having a spring biased pin extending thereinto to inhibit wear on the mechanism as it is pivoted.

3 Claims, 7 Drawing Figures

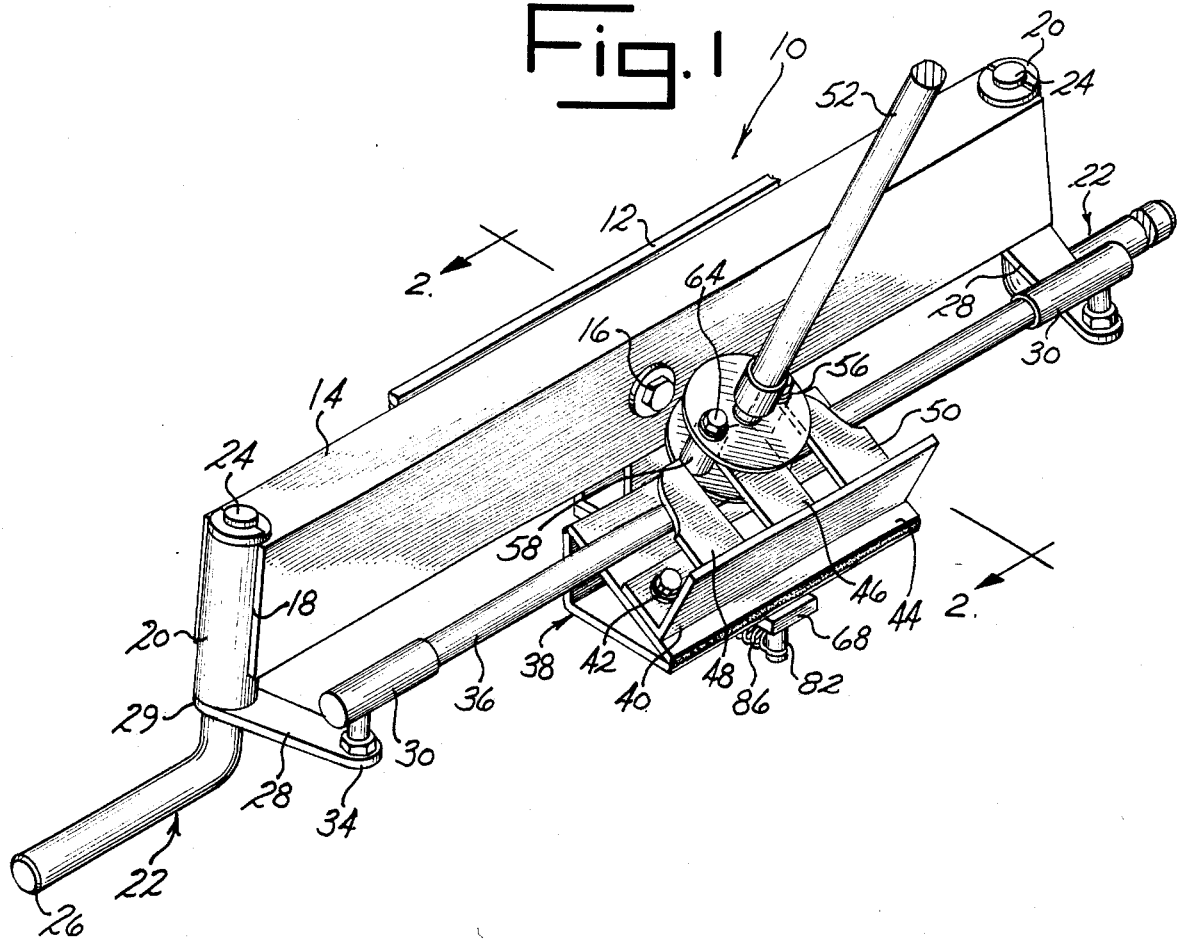
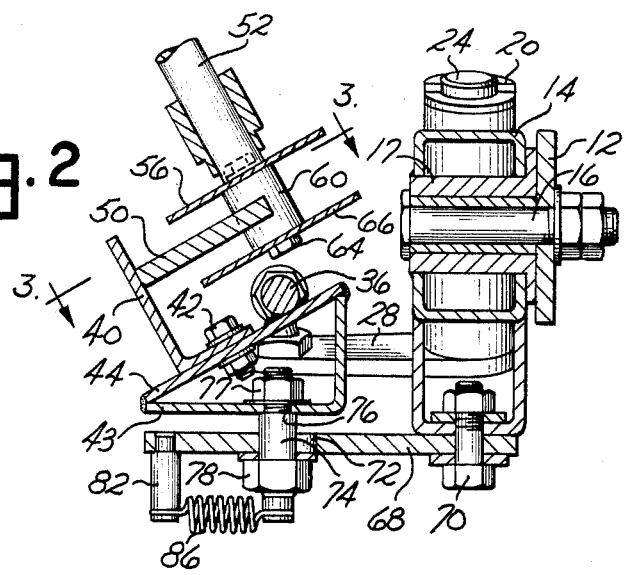

VEHICLE STEERING MECHANISM

SUMMARY OF THE INVENTION

This invention relates to a vehicle steering mechanism and will have special application to a steering mechanism for a lawn and garden tractor.

The steering mechanism of this invention utilizes a roll cam steering gear having a pair of spaced cam followers which are positioned for 180° rollover movement about a center cam finger and pair of peripheral cam fingers. The gear is suitably connected to a linkage which controls the turning of the vehicle wheels. The pivot member of the mechanism is located in a wear slot which is spring biased for added longevity of the mechanism. Some examples of prior steering gear utilizing roll cams may be found in French Pat. No. 344,843; and U.S. Pat. Nos. 858,186; and 1,320,278.

Accordingly, it is an object of this invention to provide for an improved vehicle steering gear.

Another object of this invention is to provide for a steering gear which is efficient and economical.

Another object of this invention is to provide for a roll cam steering gear which is capable of 180° rollover of the cams.

Still another object of this invention is to provide for a roll cam steering gear which renders the vehicle easier to steer.

And still another object of this invention is to provide a roll cam steering mechanism which allows stable turning of the vehicle in response to the steering wheel.

Still other objects will become apparent upon a reading of the following descriptions.

BRIEF DESCRIPTION OF THE DRAWINGS

A preferred embodiment of the invention has been chosen for purposes of illustration wherein:

FIG. 1 is a fragmentary perspective view of the steering mechanism.

FIG. 2 is a sectional view taken along line 2—2 of FIG. 1.

DESCRIPTION OF THE PREFERRED EMBODIMENT

Figure 3:
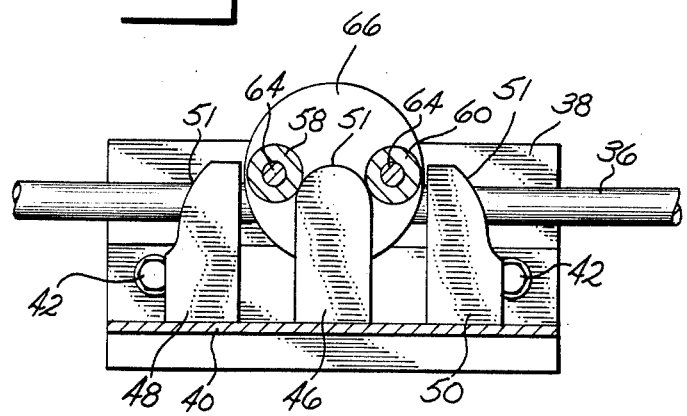
FIG. 3 is a sectional view taken along line 3—3 of FIG. 2 and showing the mechanism in a straight position.

The preferred embodiment of the invention described herein is not intended to be exhaustive or to limit the invention to the precise form disclosed. It is chosen and described to explain the principles of the invention and its application and practical use to enable others skilled in the art to utilize the invention.

The steering mechanism 10 of this invention is preferably used in conjunction with a vehicle such as a lawn and garden tractor (not shown) which has a frame of which part 12 is a component. A transverse support 14 forming a component of the vehicle frame is pivotally connected to frame part 12 by a central bolt 16 and bushing 17 for movement in a generally vertical plane. Support 14 includes slotted end edges 18 which carry fixed bushings 20. An L-shaped axle rod 22 is journalled in each bushing 20 at one end 24 and is connected to a vehicle front wheel (not shown) at its other axle end 26. An arm 28 is fixedly connected at one end 29, as by welding, to each rod 22 adjacently below bushing 20. A pivot member 30 is connected to the opposite end 34 of each arm 28. A steering connector rod 36 is pivotally connected to each pivot member 30.

Rod 36 is fixedly connected, as by welding, at its center to a box frame 38, which is preferably of triangular cross sectional configuration as shown in FIGS. 1 and 2. An L-bracket 40 is connected by bolts 42 to the hypotenuse section 44 of frame 38. Three parallel fingers 46, 48 and 50 extend from L-bracket 40 and are of the peripheral configuration shown in FIGS. 3–5. Each finger 46, 48, 50 includes a cam surface 51. A drive shaft 52 is connected to the vehicle steering wheel (not shown). A pair of spaced discs 56 and 66 are coaxially connected to the lower end of drive shaft 52. A pair of cam follower rollers 58 and 60 are journalled between discs 56 and 66 upon bolts 64. Rollers 58 and 60 are equally radially spaced from the axis of shaft 52. In FIG. 3, steering mechanism 10 is shown in the straight ahead steering position.

A bar 68 extends between support 14 and frame 38. Bar 68 is pivotally attached to support 14 by bolt 70 and is pivotally attached to frame 38 by a stud 74. A slot 72 is formed in bar 68. A neck part of stud 74 extends through a hole 76 in frame leg 43 and is secured by nut 77. Stud 74 fits slidably within bar slot 72 and is retained by nut 78. A helical spring 86 in tension is connected at its one end to a pin 82 which extends from bar 68 and at its other end to projecting end of bolt 74. Spring 86 serves to dampen the movement of stud 74 within bar slot 72 and to return the steering mechanism 10 to a normal or straight ahead position.

Figure 4:
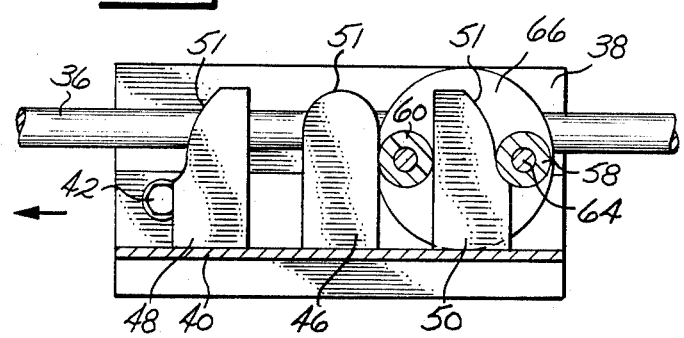
FIG. 4 is a sectional view similar to FIG. 3 showing the mechanism in a full right turn position.
Figure 5:
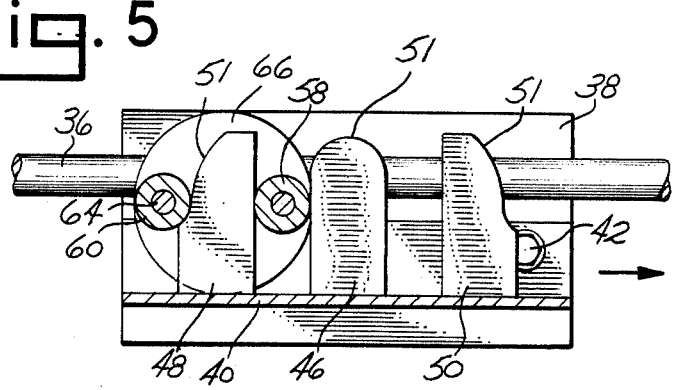
FIG. 5 is a sectional view similar to FIG. 4 showing the mechanism in a full left turn position.
Figure 6:
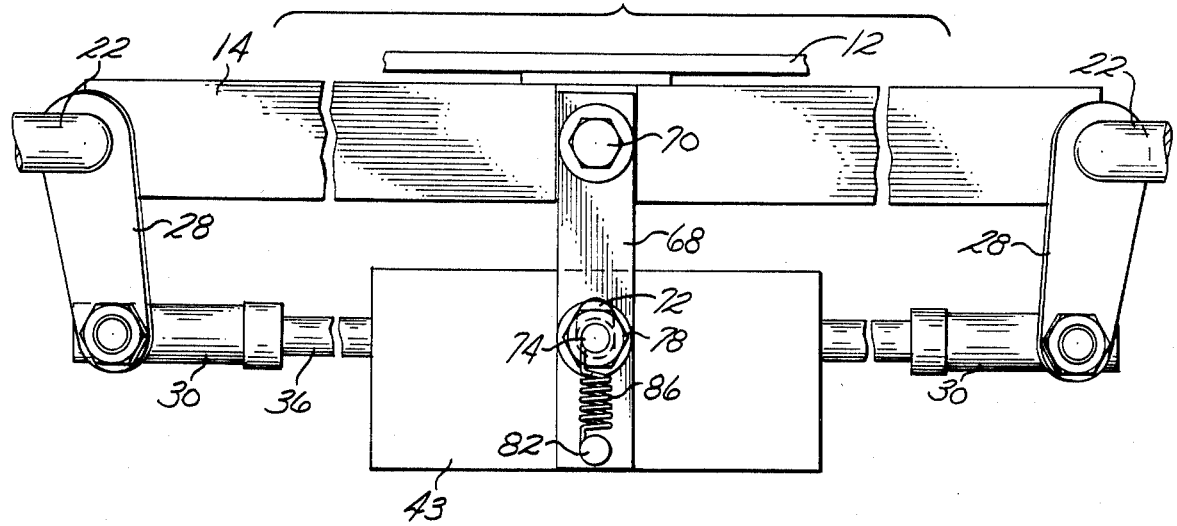
FIG. 6 is a fragmentary bottom view of the mechanism.
Figure 7:
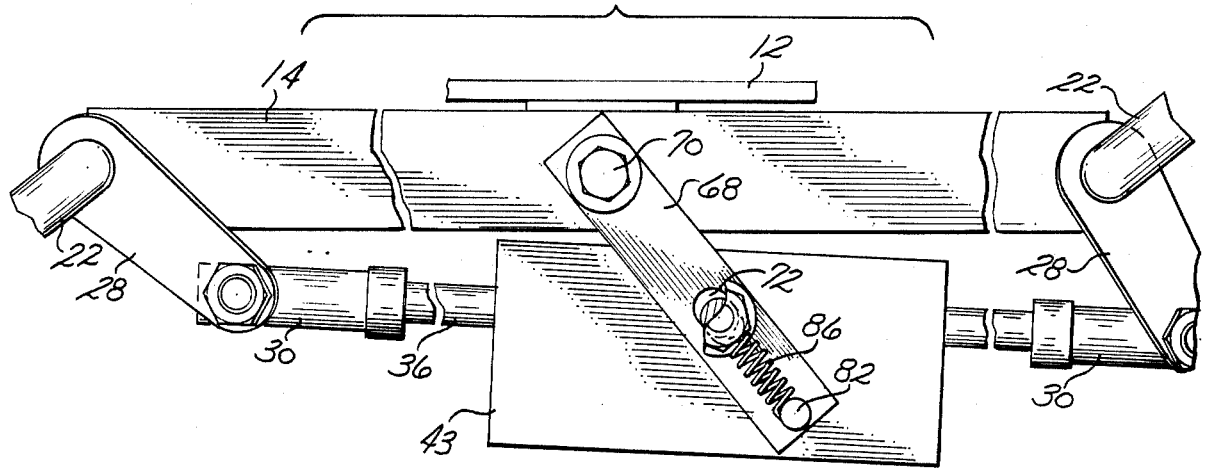
FIG. 7 is a view similar to FIG. 6 showing the mechanism in a full right turn position.

FIGS. 3–7 shown the steering mechanism 10 in operation. FIGS. 3 and 6 show axle rods 22 in a straight ahead position. In FIGS. 4 and 7 the drive shaft 52 has been rotated 180° to the right in response to the clockwise turning of the steering wheel. As shaft 52 turns in this fashion, roller 58 moves into contact with the cam surface 51 of finger 50 to urge the shiftable frame 38 and connected rod 36 to the left. This movement of rod 36 causes axle rods 22 and the vehicle wheels (not shown) to turn to the right. As frame 38 shifts, bar 68 pivots about bolt 70 and stud 74 shifts within slot 72 against the tension of spring 86. When the operator releases the steering wheel, the biasing of spring 86 causes frame 38 and shaft 52 to return to their original straight ahead position of FIG. 3. FIG. 5 shows the drive shaft 52 turned 180° to the left and is illustrative of a full left hand turn of the vehicle whereupon the cooperation of frame 38, rod 36, and axle rods 22 turn the wheels to the left. The general operation is the same for the left turn as with the right turn with shaft 52 generally pivoting about roller 60 and roller 58 engaging cam surface 51 of finger 48 to urge frame 38 to the right. Again, spring 86 will return the frame 38 and drive shaft 52 to their straight ahead position.

It is to be understood that the invention is not limited to the above-given details, but may be modified within the scope of the appended claims.

I claim:

1. A steering mechanism for a vehicle which includes a frame, axle means for rotatably securing a plurality of wheels to said frame, a steering frame connected to said frame, said support member connected to said axle means whereby transverse movement of the support member turns said axle means, said support member transverse movement having straight and turn positions, said support member including a plurality of cam fingers positioned thereon, a drive shaft having a fixed axis of rotation and including a pair of cam rollers contacting at least one of said fingers whereby rotation of said drive shaft causes said support member transverse movement, the improvement comprising a bar pivotally connected to said vehicle frame, pivot means associated with said bar for pivoting said bar relative to the support member when said cam roller rotates about said cam fingers to shift said support member from its straight toward its said turn positions, and biasing means associated with said pivot means for urging said support member into its said straight position.

2. The steering mechanism of claim 1 wherein said pivot means includes a pivot pin extending through said support member and bar, and said biasing means includes a helical spring attached to said pivot pin and said bar, said bar including an elongated slot therethrough, said pivot pin positioned within said slot to accomodate pivoting movement of said bar relative to said support member.

3. The steering mechanism of claim 1 wherein said frame includes pivot connection means for accomodating vertical movement of the frame.

* * * * *